United States Patent [19]

de Bosredon et al.

[11] 3,997,189

[45] Dec. 14, 1976

[54] SAFETY WEBBING

[76] Inventors: Pierre de Bosredon, 17 rue Millet, 24100 Bergerac; Andre Cosset, 5 rue Claude Lebret, 93460 Gournay sur Marne, both of France

[22] Filed: July 2, 1975

[21] Appl. No.: 592,598

[30] Foreign Application Priority Data

July 4, 1974 France .............................. 74.23591

[52] U.S. Cl. ............................... 280/744; 297/385
[51] Int. Cl.² ......................................... B60R 21/10
[58] Field of Search ............. 280/150 SB, 744, 745, 280/746, 747; 297/385, 388, 389

[56] References Cited

UNITED STATES PATENTS

| | | | |
|---|---|---|---|
| 3,439,932 | 4/1969 | Lewis et al. .................. | 280/150 SB |
| 3,486,792 | 12/1969 | Stoffel .......................... | 297/389 X |
| 3,533,659 | 10/1970 | Major ........................... | 280/150 SB X |
| 3,542,425 | 11/1970 | Pringle ......................... | 280/150 SB X |
| 3,547,490 | 12/1970 | Stoffel .......................... | 280/150 SB X |
| 3,592,507 | 7/1971 | Glonet ........................... | 297/388 X |
| 3,610,361 | 10/1971 | Pringle ......................... | 280/150 SB X |
| 3,645,549 | 2/1972 | Jantzen ........................ | 280/150 SB X |

*Primary Examiner*—Robert R. Song
*Assistant Examiner*—Michael J. Forman

[57] ABSTRACT

Device for storing and paying out automatically a predetermined length of webbing, for example of a safety belt, and also for causing the voluntary or automatic instantaneous locking thereof, said webbing being essentially passed around wedge and pulley means within a case containing a return sandow. In the release position pulling the webbing will pay out the stored webbing as desired, thus tensioning the band which will tend to produce the reverse movement, i.e. the storage of the webbing. The voluntary or automatic locking of the webbing in all positions is obtained by causing the movement of a movable member adapted to wedge said webbing in relation to said case.

5 Claims, 2 Drawing Figures

SAFETY WEBBING

BACKGROUND OF THE INVENTION

The present invention relates to an improved mounting or adjustable fixing for safety webbing, notably belts of safety harnesses used in motor vehicles, and is directed to a device of this kind which affords an easy adjustment and locking, at will, of the useful length of the webbing.

SUMMARY OF THE INVENTION

To this end, the belt mounting according to this invention comprises means for directly locking the elongated or shortened webbing, said means being controlled either electrically or mechanically.

According to a preferred form of embodiment of this invention, this mounting is characterized in that said webbing has its anchored end portion so arranged as to engage a pair of lateral forwardly convergent surfaces of an elongated wedge-shaped member and also the rear rounded surface of this member which interconnect said lateral forwardly convergent surfaces, said wedge-shaped member being adapted to slide axially in a cavity formed likewise with forwardly convergent lateral surfaces having the same angle of convergence as said member, whereby any traction force applied by means of said webbing to said wedge-shaped member causes the latter to slide forwards until the two lateral sides of the webbing which surround said wedge-shaped member are clamped and locked between, the convergent lateral surfaces of this member and the convergent lateral surfaces of said cavity in which said member is slidably fitted, means being also provided for causing at will the backward movement of said wedge-shaped member and thus enable the webbing to slide freely around this member in one or the other direction for adjustment purposes.

DESCRIPTION OF THE PREFERRED EMBODIMENT

Figure 1:
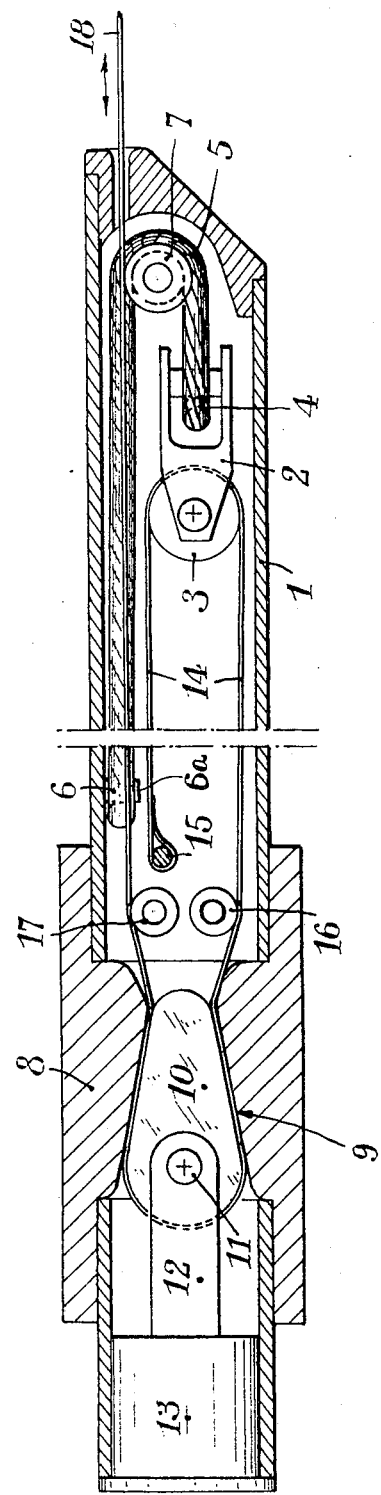
FIG. 1 shows a preferred embodiment of the present invention, showing an axial longitudinal section through an improved belt mounting.

In the following disclosure, the terms "forward", "front" or the like designate the end of the mounting from which the safety webbing emerges, and the terms "back", "rear" and the like designate the opposite end of the device which is normally anchored to the vehicle.

The mounting comprises a preferably rectangular parallelipipedic case 1 in which a strap 2 is mounted for free sliding movement. Mounted for free rotation to the rear end of this strap 2 is a roller 3 and the front end of the strap 2 has a forked configuration with a cross pin to which one end 4 of an elastic band 5 is attached. The other end 6 of band 5 is secured to the case 1 by means of a stud 6a, after passing around a pulley 7. Thus, the band 5 is tensioned whenever the strap 2 is moved in the rearward direction, and this strap 2 is constantly urged to its initial position.

At its opposite end the case 1 is rigidly assembled with a body 8 in which a cavity 9 having convergent lateral surfaces is formed. This cavity 9 has its narrow end located adjacent the rear end of case 1 and has slidably fitted therein a movable wedge-shaped member 10 having the same angle of convergence as said cavity 9. This wedge-shaped member 10 is pivotally connected by means of a pin 11 to a yoke 12 attached to an electromagnet 13. According to the direction in which this electromagnet 13 is operated, the wedge-shaped movable member 10 will either engage the convergent lateral surfaces of cavity 9, or move away therefrom.

The safety webbing 14 is mounted in this mechanism by having its end fixed to the case 1 by means of an anchor stud 15. The belt 14, then passes over the roller 3 and is guided by a first guide roller 16 adjacent said stud 15, passes subsequently over the movable wedge-shaped member 10, and is again guided but in the opposite direction by another guide roller 17 adjacent said stud 15, before emerging from the case 1 at 18.

With the mounting described hereinabove by way of illustration a substantial length of webbing can be stored and paid out, while locking the belt against movement instantaneously not only in the pay-out direction, even if a strong pull is exerted thereon, but also in the opposite direction for storing or reeling up a non-used length of webbing which is thus locked as desired in a predetermined position.

Thus, in the absence of any traction force applied to the webbing 14 at 18, the movable wedge-shaped member 10 can be moved away from its position of engagement with the cavity 9 of body 8 by simply energizing the electromagnet 13, thus releasing the webbing 14 which in this case can move freely in either direction depending on whether it is pulled at 18 or urged inwards by the movement of strap 2 responsive to the elastic force of band 5.

When the electromagnet 13 is actuated in the opposite direction the moveable wedge-shaped member 10 tends to engage the cavity 9 of body 8, thus locking or wedging the two sides of webbing 14 against the registering convergent surfaces of said cavity 9, so that the greater the pull exerted on the webbing at 18, the stronger the locking action exerted on the webbing by said convergent surfaces. Desiredly but not necessarily, in this mounting a spring attached to the electromagnet 13 or to the case 1 may be provided for wedging the member 10 and therefore the webbing 14, so that the webbing is locked automatically even in case of failure or break in the electric supply circuit. An inertia switch of the cut-off type may be used for automatically locking the webbing in case of sudden deceleration. A time-lag switch (not shown) may be used for automatically and systematically releasing the webbing. Furthermore, pilot lamps may be provided for indicating the momentary position of the mechanism.

Figure 2:
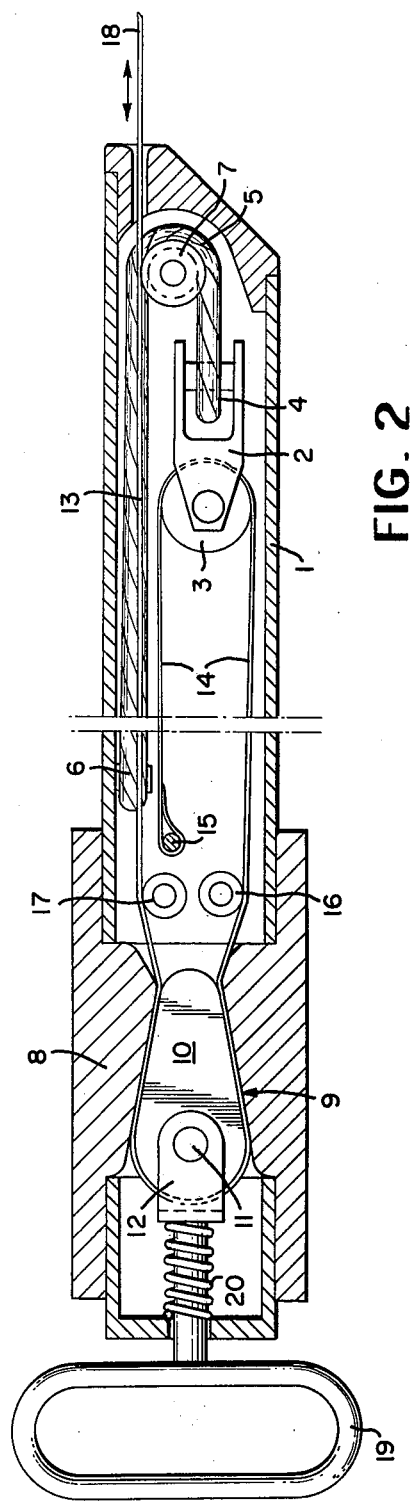
FIG. 2 shows a section through another embodiment of the invention.

The movable member 10 may also be controlled by using simple manual mechanical means 19 in lieu of the electromagnet, and in this case, if desired, a spring 20 may be used for urging the member 10 to its locking position (FIG. 2).

In a modified form of embodiment of this device the movable wedge-shaped member 10 may be controlled by an eccentric member substituted for the pivot pin 11 and which, by rotating, may cause this member to engage the convergent surfaces of cavity 9. This rotation, controlled mechanically or electrically, causes the movable member 10 to move in one or the other direction while remaining in bearing engagement with the cavity 9 of body 8, so as to lock the webbing in one case or release same in the other case. Finally, a modified form of embodiment of this invention may comprise means for rotating the member 10 about its axis. In this case, an elliptic shape is preferred for this member 10, and the pivot pin 11 is secured to the body 8.

Of course, it would constitute no departure from the present invention to bring various modifications thereto as may occur to those conversant with the art. Thus, notably, the arrangement of the locking means in relation to the case 1, which may even provide a complete separation between said means and the case 1, may be contemplated, so that the locking means and the webbing storing means, outside the connection through the webbing itself, may be operated independently.

What is claimed as new is:

1. Device for locking and releasing a strap section of a safety belt, notably of the type used for passengers of motor vehicles, which comprises: a case open at one end and having a pair of opposed flat walls converging towards said one end thus forming a longitudinal channel of a width decreasing gradually towards said one end in order to form thereat a passage of minimum width, a wedge-shaped movable member adapted to slide freely in said channel and to be wedged when it slides towards said one end, said wedge-shaped member having two opposed flat faces converging towards said one end with the same convergence as said channel-forming flat walls, said last mentioned flat faces being interconnected by a rounded face, one end of the strap section to be locked and released penetrating into said case through an aperture formed at said one end and into said channel through said minimum-width passage, said strap thus forming a loop around a first lateral converging face, the rounded cylindrical face and the other lateral converging face of said movable wedge-shaped member, and emerging from said channel through the same minimum-width passage, and means for causing said movable wedge-shaped member to slide toward the other end of said case and thus unwedge said strap section wedged between the lateral converging flat faces of said wedge-shaped member and said opposed flat walls of said channel which are parallel to said lateral converging flat faces, respectively, whereby said strap section can be wedged automatically when said wedge-shaped member is allowed to slide freely toward said one end of the case and when a tractive effort is exerted on said strap section in the direction toward said one end.

2. Device as recited in claim 1, wherein said means for causing said movable wedge-shaped member to slide comprises an electromagnet.

3. Device as recited in claim 1, which comprises at said other end of said case spring means for constantly urging said wedge-shaped movable member to its strap-wedging position toward said one end of said convergent channel.

4. Device as recited in claim 1, wherein said means for causing said movable wedge-shaped member to slide comprises a manually controlled device.

5. Device as recited in claim 1, wherein said case has an extension beyond said one end, means adapted to exert a resilient tractive force on the end of the strap penetrating into said one end of said case, passing around said wedge-shaped movable member and emerging from said channel from said other end to said extension of said case, said extension having a cavity herein for receiving the length of strap section which said tractive force exerting means is adapted to cause to penetrate into said case.

* * * * *